United States Patent [19]

Aaron

[11] Patent Number: 5,157,256
[45] Date of Patent: Oct. 20, 1992

[54] SYSTEM FOR EXCHANGING SAMPLES AND ELECTRODE TIP UNITS IN A SURFACE PROBE MICROSCOPE

[75] Inventor: Timothy M. Aaron, Rochester, N.Y.

[73] Assignee: Burleigh Instruments Inc., Fishers, N.Y.

[21] Appl. No.: 742,786

[22] Filed: Aug. 8, 1991

[51] Int. Cl.⁵ .............................................. H01J 37/26
[52] U.S. Cl. ................................. 250/306; 250/442.11
[58] Field of Search ............................ 250/306, 442.11

[56] References Cited

U.S. PATENT DOCUMENTS

| | | | |
|---|---|---|---|
| 4,874,979 | 10/1989 | Rapp | 310/328 |
| 4,908,519 | 3/1990 | Park | 250/306 |
| 4,992,660 | 2/1991 | Kobayashi | 250/306 |

*Primary Examiner*—Jack I. Berman
*Attorney, Agent, or Firm*—Martin Lukacher

[57] ABSTRACT

A surface probe microscope such as a scanning tunneling microscope has a platform on which an actuator and a sample (specimen) holder are disposed in proximity to each other; the actuator being adapted to move a electrode tip into surface probing relationship with the specimen. Holders for retaining samples at storage stations and a carrier for retaining a plurality of electrode tip units are supported on opposite sides of a region in which a laterally extending portion of a longitudinally and rotationally movable arm is disposed. The lateral arm portion has, on one side thereof, a member for engaging an electrode tip unit in the actuator and moving it to the carrier for location in a receptacle therein. Rotation of the arm also indexes the carrier to present different tip units for engagement so that tip units can be exchanged between the actuator and the carrier. On the opposite side of the carrier are the holders for sample retainers. The lateral portion of the arm has pins and detents for engaging the retainers and moving them between the storage stations and the sample holder in proximity to the actuator for the electrode tip.

5 Claims, 5 Drawing Sheets

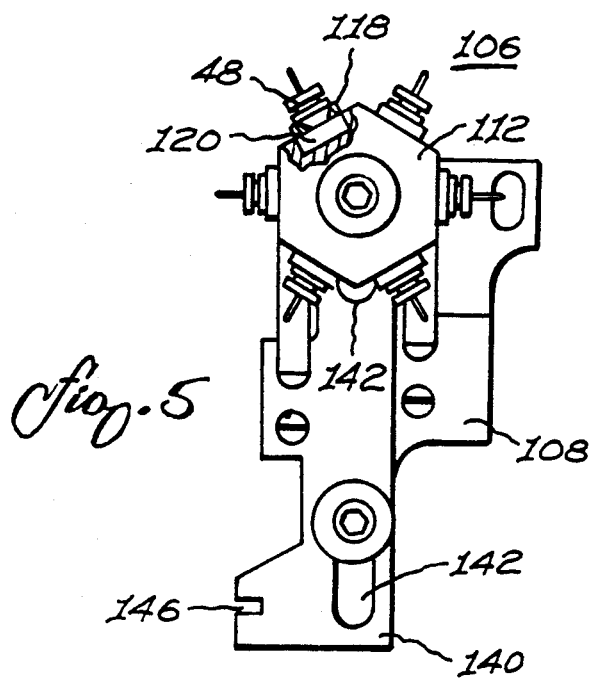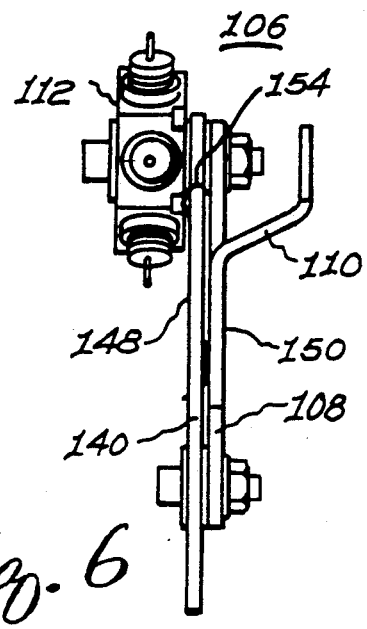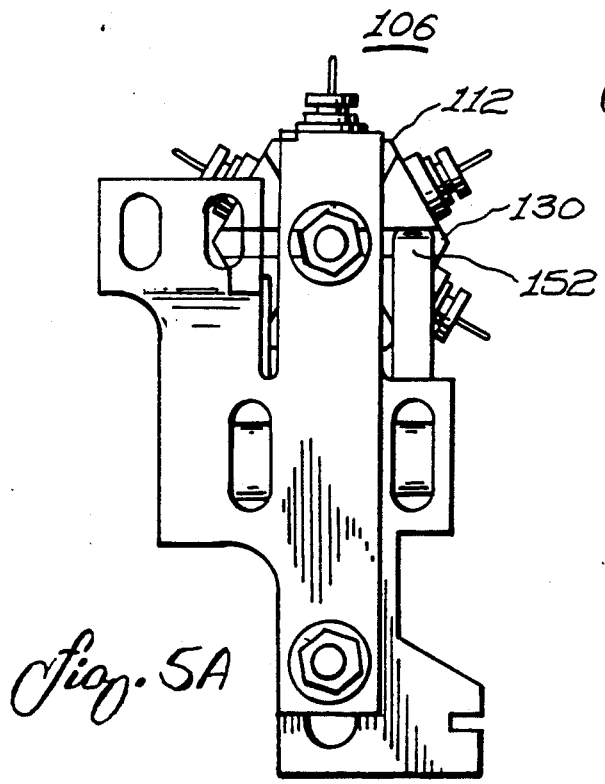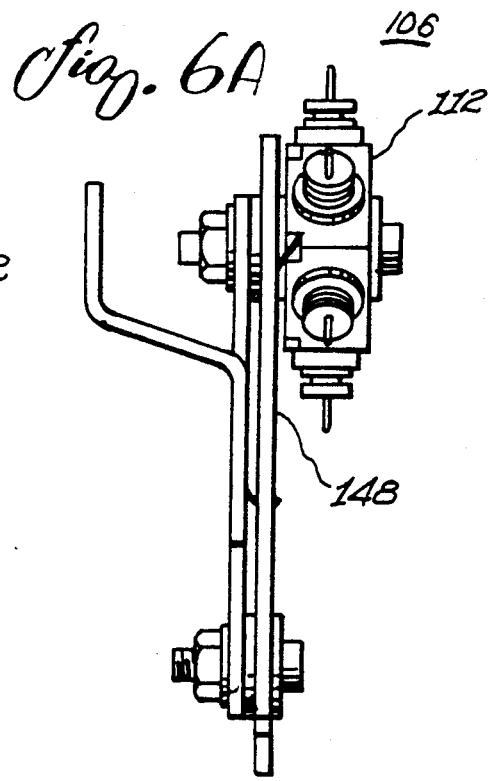

SYSTEM FOR EXCHANGING SAMPLES AND ELECTRODE TIP UNITS IN A SURFACE PROBE MICROSCOPE

The present invention relates to surface probe microscopes and particularly to a system which enables electrode tip units to be exchanged. The invention also provides an integrated system for the exchange of electrode tip units in the electrode or probe holder or actuator of the microscope and samples (specimens to be examined) and the retainers on which they are mounted with other samples in storage locations in the microscope.

The invention is especially suitable for use with a surface probe microscope of the scanning tunneling microscope (STM) type. The sample and electrode tip exchanger provided by the invention may be found useful in other surface probe microscopes, such as atomic force microscopes.

Surface probe microscopes are sensitive instruments which require location of probes with respect to specimens at distances in the micron and submicron range so as to probe the atomic structure of the surface of the specimen. These microscopes require the use of actuators for moving the probe or the sample, such actuators as are presently preferred for use in a system embodying the invention are described in U.S. Pat. No. 4,874,979 issued Oct. 17, 1989 to Louis Rapp. That patent provides a discussion of the background of STM microscopy.

To facilitate the use of surface probe microscopes, it has been found that the probes, also known as the electrodes or tips, need to be exchanged. Such tips may be damaged in use or different tips may be needed for different experiments, for example, depending upon the specimen material. It is also desirable that the specimens themselves be exchangeable so as to present different specimens for examination. A STM having a specimen changer and a tip changer is shown in U.S. Pat. No. 4,908,519 issued Mar. 13, 1990. It is desirable to simplify electrode tip changing operations, to integrate specimen changing mechanisms with mechanisms for electrode tip exchange and to provide both electrode tip exchange and specimen exchange facilities which can readily be manipulated under high vacuum conditions.

Accordingly, it is the principal object of the present invention to provide an improved surface probe microscope having improved electrode tip exchange facilities which may be integrated with facilities for changing the samples to be examined by surface probe microscopy, such as scanning tunneling microscopy.

It is a further object of the present invention to provide improved mechanism for electrode tip exchange and for sample exchange which may be manipulated externally of a vacuum chamber in which the microscope components are disposed and without interference with or damage to such components.

It is a still further object of the present invention to provide an improved system for electrode tip unit exchange which also provides sample exchange facilities and which may be implemented at reasonable cost, i.e., without substantial increase in the cost of the microscope system as a whole.

Briefly described, a sample and electrode tip unit changing system for a surface probe microscope, which system embodies the invention has a support structure with a platform mounted thereon. The probe actuator and a first holder for removably receiving a retainer for a sample (specimen) to be examined is mounted on the platform. The actuator has a receptacle for removably retaining the electrode tip unit at one end thereof. The actuator provides for movement of the tip unit with respect to the specimen so as to bring the electrode tip and the surface of the specimen into probing relationship. There is provided at least a second sample holder supported on the support structure spaced from the first sample holder. A rotatable carrier is also provided which has receptacles for electrode tips spaced around the periphery thereof. An arm having a longitudinal and a lateral portion with the lateral portion, preferably being bent 90° to the longitudinal portion and located at one end of the longitudinal portion, is located on the support structure extending into a region which has the electrode tip retaining end of the actuator and the carrier on one side thereof and the specimen retainer holders on the opposite side thereof. The lateral portion of the arm is disposed in this region and has one side thereof means for engaging the electrode tip units when translated in a direction towards one side of the region. A specimen retainer and holder is located on the opposite side of the lateral arm portion and is engagable with the retainers either in operating position on the platform or in storage locations spaced from the platform. By rotating the arm when it is disposed towards the electrode unit side of the region the carrier for the electrode tips is engagable by the arm and is rotatable so as to bring different electrode tip units into different positions to present them for engagement by the tip engagement means on one side of the arm. Translation of the arm towards the opposite side of the region enables the engagement of the specimen or sample retainers and the movement thereof between storage positions and positions on the platform. Thus, both the electrode tip exchange and the specimen exchange are provided for in a manner whereby they may be integrated and manipulated selectively by the microscope operator.

The foregoing and other objects, features and advantages of the invention as well as a presently preferred embodiment thereof, will become more apparent from a reading of the following description in connection with the accompanying drawings in which;

FIG. 1 is a simplified elevational view of a scanning tunneling microscope embodying the sample and electrode tip unit changing system of the invention in accordance with a presently preferred embodiment thereof; the electrodes, the wiring thereto and the connections to the actuator are not shown and the electronics for operating the actuator, for scanning the probe across the specimen surface and for creating displays or surface profiles are not shown to simplify the presentation of the invention, reference may be had to the above-identified US patents and the references therein for further information with respect to the electronics and wiring suitable for use in the STM illustrated herein;

FIG. 5 is a elevational view of the carrier for the electrode tip units and the mechanism for indexing the carrier to present different tip units for engagement and movement to the actuator and for presenting different receptacles for tip units to receive tip units from the actuator;

FIG. 6 is a side view of the mechanism shown in FIG. 5;

FIGS. 5A and 6A are views similar to views 5 and 6, but in different position;

Figure 1:
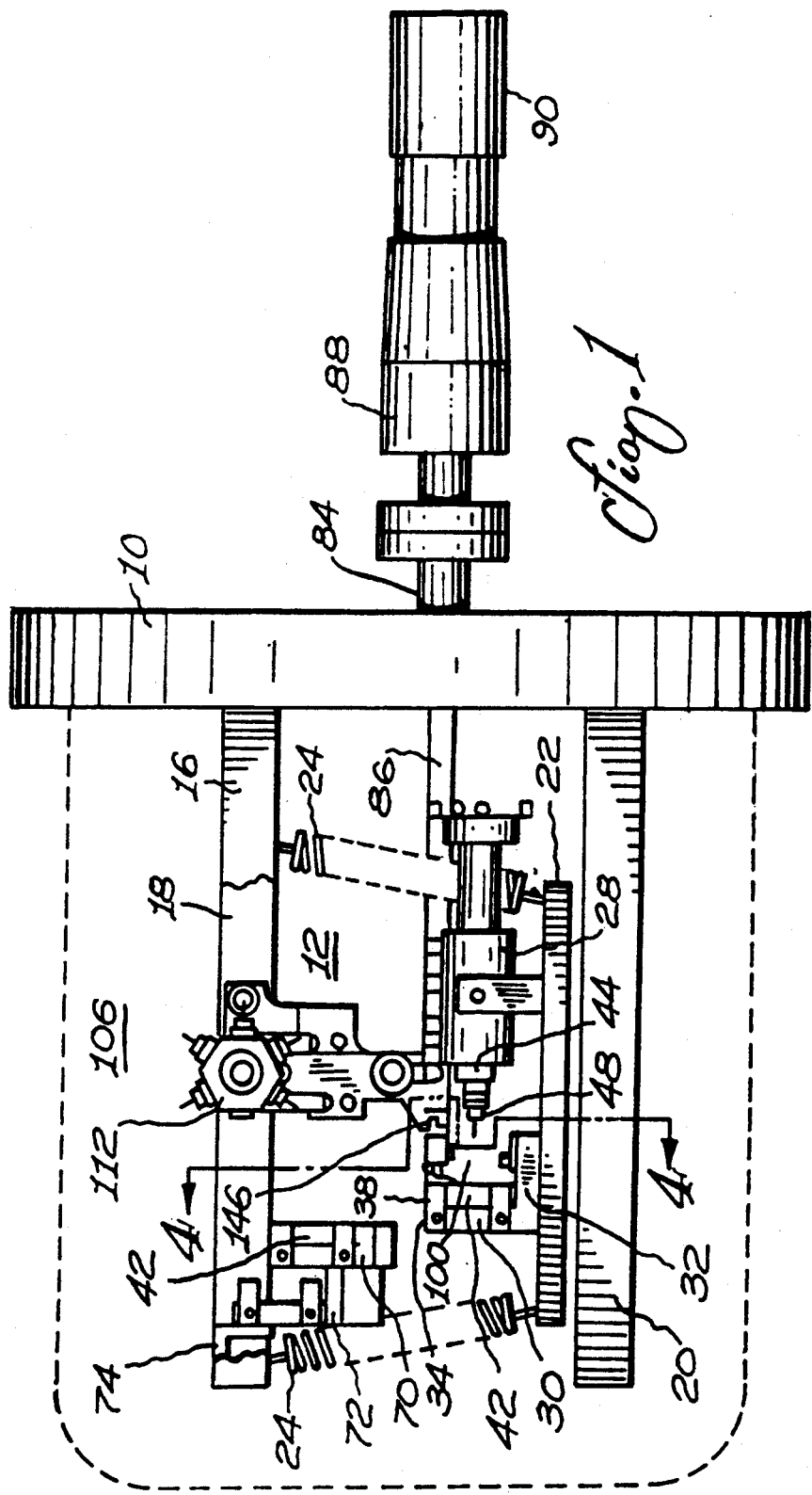
Figure 4:
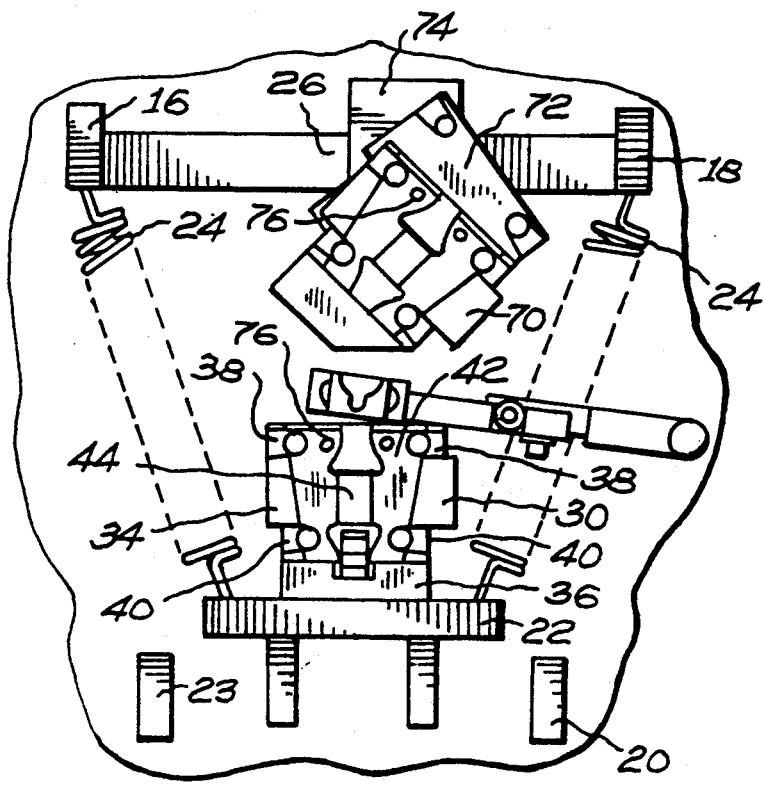
FIG. 4 is a simplified sectional view showing the specimen holding stations on the platform and in storage locations adjacent thereto.
Figure 7:
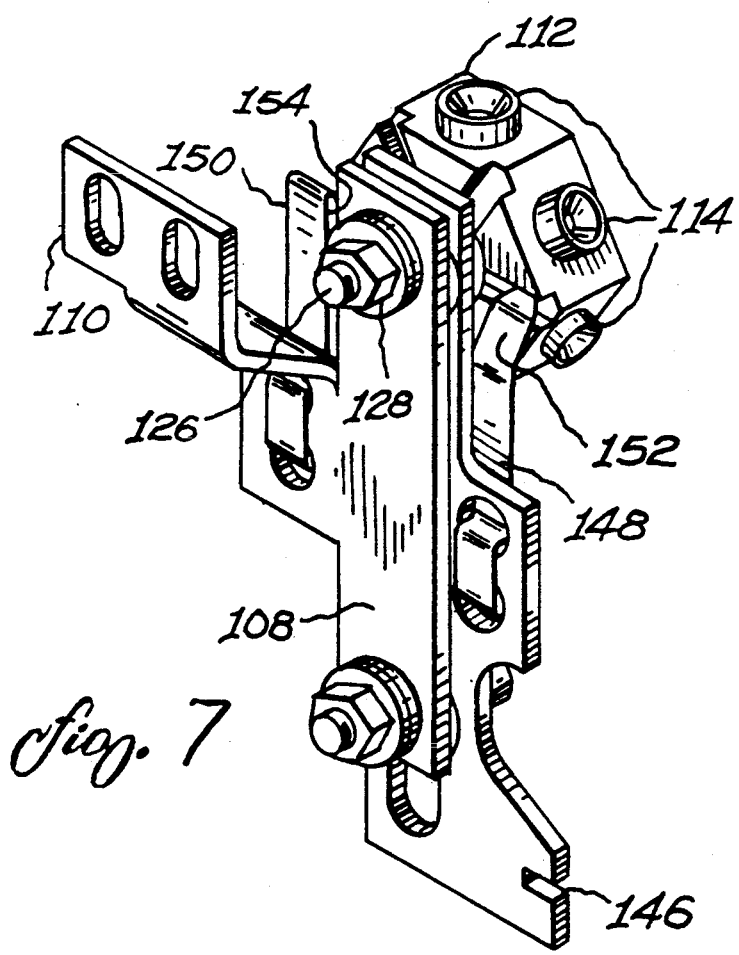
FIG. 7 is a perspective view of the mechanism shown in FIGS. 5 and 6.
Figure 8:
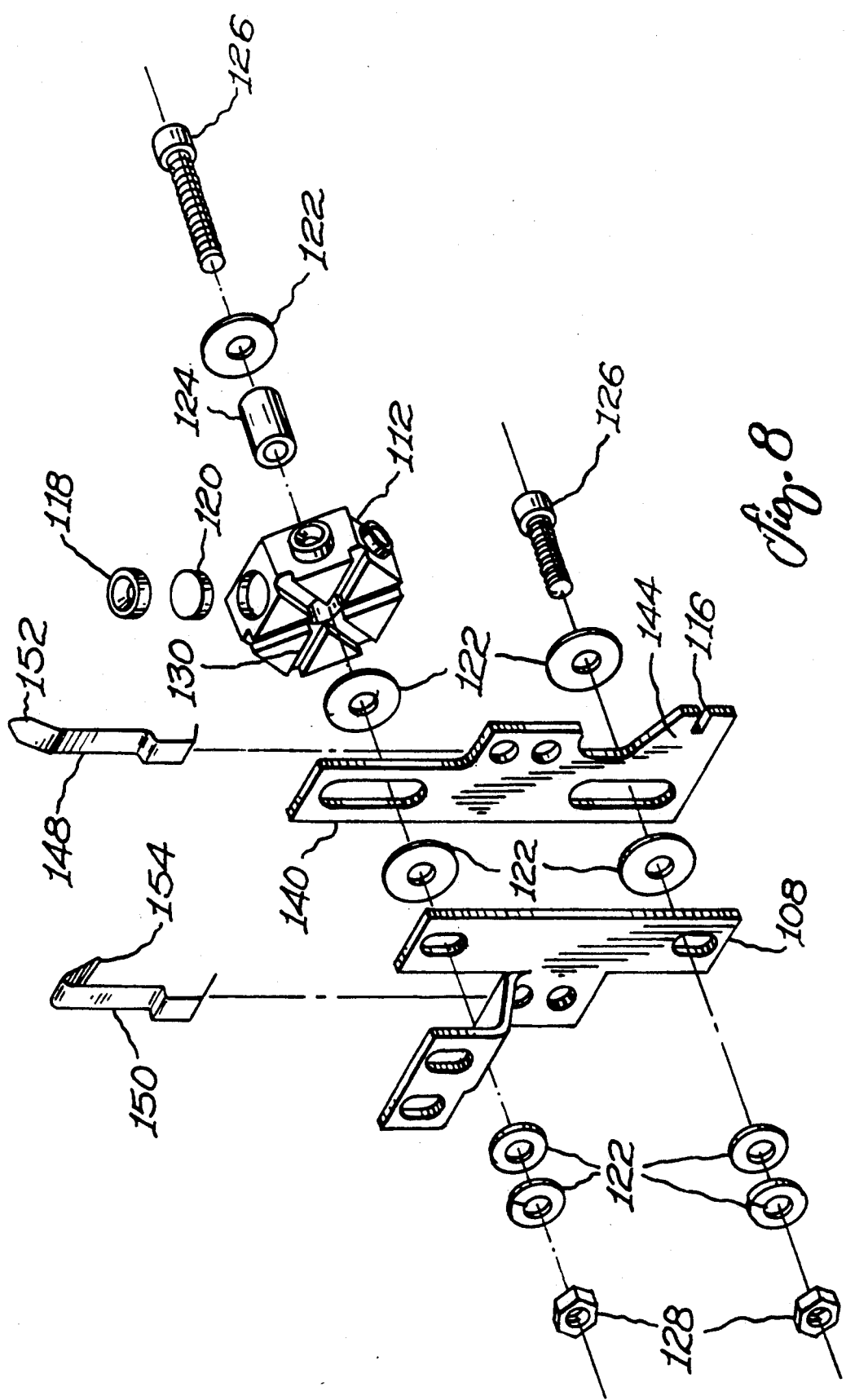
FIG. 8 is an exploded view of the mechanism shown in FIGS. 5, 6 and 7.

Referring to FIGS. 1 and 4 there is shown in a flange 10, in the form of a disc, which may receive a bell jar or chamber 14 assembled thereon. In the chamber are the components of an STM. The chamber is kept at high vacuum by a pumping system (not shown). The controls and connectors for the STM are brought out through the flange 10. The components of the STM which are related to the sample and electrode exchange system provided by the invention are illustrated in the drawings. These components as well as the other components of the STM are mounted on a support structure made up of four parallel beams 16, 18, 20 and 23 which are cantilevered from the flange 10.

A platform 22 is isolation mounted on the beams by springs 24 which extend between the beams 16–22 or struts 26 laterally connected therebetween. The platform mounts an actuator 28 such as the "Inchworm" actuator described in the above-referenced Rapp patent. Also mounted on the platform 22 is a specimen or sample holder 30. The holder 30 is an L-shaped bracket with the foot 32 of the L connected to the platform. The back 34 of the bracket is indented to a toe portion 36. Tabs 38 on the sides of the back and tabs 40 on the sides of the toe portion 36 retain a tapered or trapezoidaly shaped retainer 42, suitably of ceramic material for a specimen or sample 44. The sample is guided by the tabs 38 and 40 so that the base thereof rests on the foot 32 of the bracket 30 which provides the specimen or sample holder.

Figure 2:
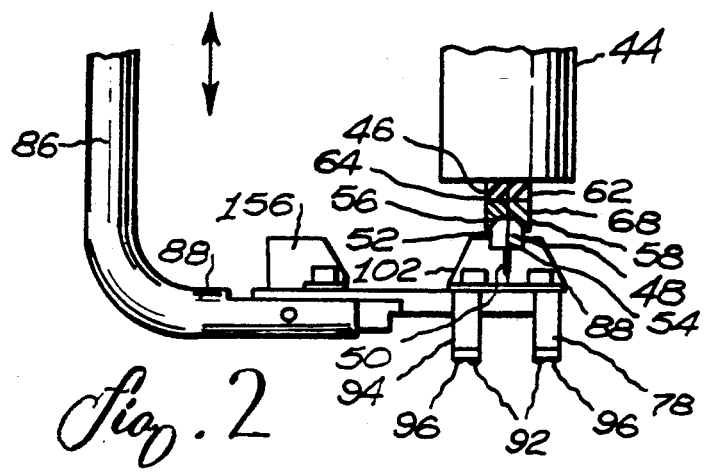
FIG. 2 is a fragmentary view, partially in section, showing a portion of the actuator, the holder for an electrode tip thereon and the tip unit contained therein and showing the arm of the sample and tip unit; exchange system in engagement with the tip unit.
Figure 3:
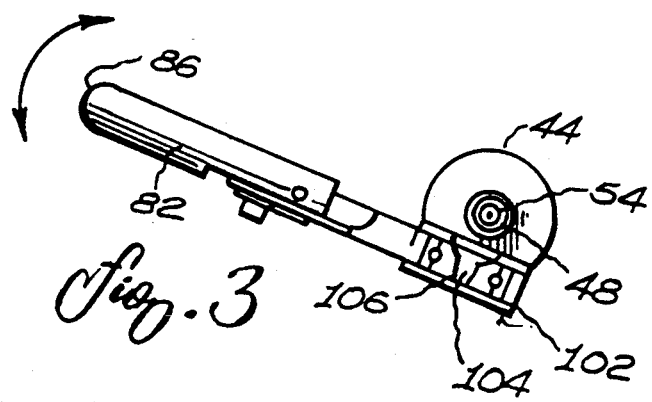
FIG. 3 is a view from the front of the portion of the system shown in FIG. 2.

The actuator 28 has a movable end 44 (see also FIGS. 2 and 3). This end has a magnetic receptacle 46 for an electrode or probe tip unit 48. The probe is a pin 50 which projects from the unit. The unit 48 is cylindrical and has a groove 52 which extends to a central, cylindrical core 54. The unit has a tapered end 56 opposite to the end where the probe or tip 50 is inserted. The unit is made of conductive material and at least the tapered portion is made of magnetizable material such as stainless steel.

The unit is received in a tapered receptacle 58 which is backed by a permanent magnet 60. An insulating disc 62 backs the magnet. A conductor 64 extends through the insulator 62 and makes contact with the tip 50 via the magnet 60 and the conductive part of the unit.

A pair of sample holders 70 and 72 are mounted in tandem relationship on a bracket 74 connected to the cross beam 26. The sample holder 70 is below and forward of the sample holder 72. Both sample holders 70 and 72 have an arrangement of tabs similar to the tabs 38 and 40 on the sample holder 30 which is mounted on the platform 22. The retainers 42 have alignment holes 76 near the upper edge thereof. These alignment holes enable the retainers to be located and engaged by a retainer transport 78. There is also a transport 80 for the tip units 48. These transports are mounted on the end of a laterally extending portion 82 of an arm 84 having a longitudinally extending portion 86 which projects through (via a vacuum seal) the flange 10.

On the portion of the arm 84 outside of the chamber 14 are mechanisms 88 and 90 for translating and rotating the arm 84 about the axis of its longitudinal portion 86. These mechanisms 88 and 90 have outer knobs which are rotatable and are provided with gears which obtain independent rotation and translation. Such mechanisms are available commercially. The suitable mechanisms may be Model No. BRLM-133 available from MDC Vacuum Products Corp. of Hayward, Califa., USA.

The sample retainer transport mechanism 78 includes pins 92 which enter into the holes 76 of the sample retainer. Above these pins are strips 94 of spring material (bronze) having latching ends 96. These ends snap over and engage and hold the sample retainers in the transport 78 when the pins are advanced into the holes 76.

By moving the arm 84 longitudinally to the back side of a region 100 (the opposite-back and front sides thereof being on opposite sides of the lateral arm portion 82), the transport 78 may be manipulated to bring the pins 92 into the holes 76 of the sample retainer. Then the arm is rotated to lift the sample out of the holder 30 and move it to a free storage location at which the holders 70 and 72 are located. There may be two holders in the system at any one time with a free holder to receive the holder 42 on the platform 22. Upon rotation of the arm, the holder 42 is removed and transported upwardly to the position of the available one of the storage holders 70 and 72. The arm is then rotated to bring the holder 42 behind the tabs of the arm. The holder then is longitudinally moved towards the front side of the region 100 so as to release the sample holder which is then detained in its retainer holder.

The transport 78 on the opposite side of the lateral arm section 82 is a generally U-shaped (in cross-section) member 102 having a tapered notch 104, the bottom 106 of which is semi-circular so as to receive the core 54 of the tip holder 48. By longitudinally moving the arm 84 towards the front side of the region 100, the member 102 is brought so that its front edge enters the groove 52. The member can then be translated towards the back of the region and rotated. Such rotation brings the tip to a tip carrier 106 having a plurality (6) receptacles spaced around the periphery of the carrier 106. The carrier 106 is mounted on a plate 108 attached to the beam 18 by a bracket section 110 thereof (see FIGS. 5, 6, 7 and 8).

The carrier s rotatable part 112 is hexagonal in shape. Each hexagonal side has a magnetic tip unit receptacle 114 of a design similar to the receptacle of the movable part 44 of the actuator 28 (see FIG. 2). As shown in FIG. 5, this receptacle has a front section 118 with a tapered hole for receiving the tapered end of the tip unit 48. A magnet disc 120 backs the tapered front end of each receptacle 114 and holds a tip unit (which is of magnetic material) aligned in the receptacle in a manner similar to the receptacle 48 as described in connection with FIG. 2.

The rotatable carrier is journaled in the support plate 108 by an arrangement of washers 122, a sleeve 124 and an assembly nut and bolt 126 and 128. The rear side of the carrier 112 has six radial grooves 130. These grooves define the six positions of the carrier (60° apart) in each of which a different receptacle 114 is presented on the forward side of the region so that it can receive a tip unit 48 or have a tip unit 48 extracted therefrom by the transport 80 on the lateral portion 82 of the arm 84.

The carrier is rotated by a reciprocable member 140 having slots 142 through which the assembly holding the carrier 112 (the sleeve 124 and bolt 126) extend. The lower end 144 of the reciprocable member has a lateral extension with a notch 146. A spring finger 148 is attached to the reciprocable member. A fixed spring finger 150 is attached to the member 108 which is connected to the beam 18 and is therefore stationary (i.e., fixed). Each of these fingers 148 and 150 has a detent 152 and 154 bend. The bends are upwardly in the case of the end 152 and downwardly in the case of the end of 154 of the fixed finger 150. These finger ends 152 and 154 enter the grooves 130 in the rotatable carrier 112.

In operation, a tab 156 on the lateral portion 82 of the arm (see FIG. 2) enters the notch 146. Upon rotation of the arm 84 the reciprocable member 144 reciprocates the finger 148 and its end 152 which engages and rotates the carrier 60°. Such rotation is permitted because of the bent end 154 of the fixed finger 150. When the reciprocable member moves in the opposite direction downwardly the spring finger, because of the bend in its end, releases from the groove until it reaches the next groove. At this time the end 154 of the fixed finger 150 prevents rotation of the carrier and yieldably locks it into position. Thus, upon each reciprocation (a complete cycle upward and downward) of the reciprocable member 140, the carrier is advanced one position (60°) and presents a new receptacle for a electrode tip in position to be transported by the transport 80 between the carrier 112 and the reciprocable in the actuator end 44.

From the foregoing description, it will be apparent that there has been provided an integrated sample and electrode tip exchange system for a surface probe microscope. Components of the system, such as the tip exchange mechanism thereof, made be used if specimen exchange is not needed. Also specimen exchange may be used without tip unit exchange. The system integrates both sample and tip unit exchange in a manner whereby they may be used without interference of the operation of the microscope. Variations and modifications in the herein described system and the mechanisms thereof, within the scope of the invention, will undoubtedly suggest themselves to those skilled in the art. Accordingly, the foregoing description should be taken as illustrative and not in a limiting sense.

I claim:

1. A sample and an electrode tip unit changing system for a surface probe microscope which comprises a support structure, a platform mounted on said support structure, an actuator having means for removably retaining one of said tip units, a first receptacle for removably receiving a retainer for said sample in the vicinity of said tip so that said tip can be located in surface probing relationship with said sample, at least a second receptacle supported on said support structures in a sample retainer storage location spaced from said first receptacle, a rotatable carrier having a periphery and means disposed along said periphery for removably retaining a plurality of said tip units at a plurality of positions spaced about said periphery, an arm having a longitudinal portion and a lateral portion, said lateral portion being disposed at an end of said longitudinal portion, said lateral portion being movable in a longitudinal direction and being rotatable about a longitudinal axis along said longitudinal portion in a region located between said sample retainer receptacles and said carrier and said actuator, first means on said lateral arm portion for engaging and moving said sample retainers between said first and second receptacles for said sample retainers when said arm is translated longitudinally towards one side of said region, and second means on said lateral arm portion for moving said tip units between said actuator and said carrier when said arm is translated towards an opposite side of said region.

2. The system according to claim 1 wherein means operated by said arm upon rotation thereof are provided for rotating said carrier to bring different ones of said tip unit retaining means into positions for engagement and movement by said arm.

3. The system according to claim 2 wherein said carrier rotating means includes means for indexing and holding said carrier in said positions to present said tip units for engagement and movement by said arm.

4. An electrode tip unit exchange system for a surface probe microscope having a holder for individual tip units at one end of a probe holder thereof, which system comprises a rotatable and translatable arm having means for engaging and carrying one of said tip units at a time, a rotatable carrier having a plurality of receptacles each for removably receiving a different tip unit and each spaced from each other along the periphery of said carrier, means for rotating said carrier to index said carrier successively to a plurality of positions at which said receptacles and tip units therein are presented for receiving tip units and for engagement of tip units therein respectively, and said rotating means having a member engagable by said arm for operating said rotating means upon rotation of said arm.

5. The system according to claim 4 wherein said rotating means comprises a reciprocable member having a first spring finger movable therewith, a plurality of radial grooves corresponding to said positions located in said carrier and into which said first finger is receivable upon reciprocation of said member in one direction to enable said carrier to rotate in said one direction and being released from said groove upon translation of said reciprocable member in an opposite direction to said one direction, a second spring finger fixed with respect to said carrier which is received in different ones of said plurality of grooves to enable rotation in said one direction and prevent rotation of said carrier in said opposite direction, said carrier being rotated upon each reciprocation of said reciprocable member.

* * * * *